United States Patent [19]

Ijames

[11] Patent Number: 5,435,425
[45] Date of Patent: Jul. 25, 1995

[54] CLUTCH BRAKE AND METHOD FOR ATTACHING A CLUTCH BRAKE TO A SHAFT

[75] Inventor: Carl E. Ijames, Sullivan, Mo.

[73] Assignee: Ace Manufacturing and Parts Co., Sullivan, Mo.

[21] Appl. No.: 142,724

[22] Filed: Oct. 25, 1993

[51] Int. Cl.6 .................... F16D 67/02; F16D 65/12
[52] U.S. Cl. .................... 192/13 R; 192/107 R; 192/DIG. 1; 188/218 XL; 403/344; 29/453
[58] Field of Search ............... 192/13 R, 18 R, 70.13, 192/107 R, DIG. 1; 188/73.2, 73.32, 218 XL; 29/453; 403/344

[56] References Cited

U.S. PATENT DOCUMENTS

| | | | |
|---|---|---|---|
| 4,512,450 | 4/1985 | Babcock | 192/DIG. 1 X |
| 5,031,739 | 7/1991 | Flotow et al. | 192/13 R |
| 5,076,406 | 12/1991 | Gregory et al. | 192/13 R |
| 5,285,881 | 2/1994 | Lero et al. | 192/13 R |
| 5,332,075 | 7/1994 | Quigley et al. | 192/107 R |

Primary Examiner—Richard M. Lorence
Attorney, Agent, or Firm—Senniger, Powers, Leavitt & Roedel

[57] ABSTRACT

A clutch brake having at least a first section and a second section, a central opening and a generally annular friction surface facing a braking mechanism and to selectively engage the braking mechanism for braking rotation of the shaft. Tabs and recesses selectively interconnect the first and second sections together. The first and second sections are selectively positionable in a disconnected configuration in which the annular friction surface is discontinuous and the sections are movable in a generally radial direction relative to the shaft, and an interconnected position in which the friction surface is substantially continuous and the first and second sections enclose the shaft in the central opening and are held from substantial radial motion relative to the shaft. Whereby, the clutch brake may be installed on the shaft without disconnecting the shaft from the transmission or the engine. A method of attaching the clutch brake to the shaft is further disclosed herein.

17 Claims, 2 Drawing Sheets

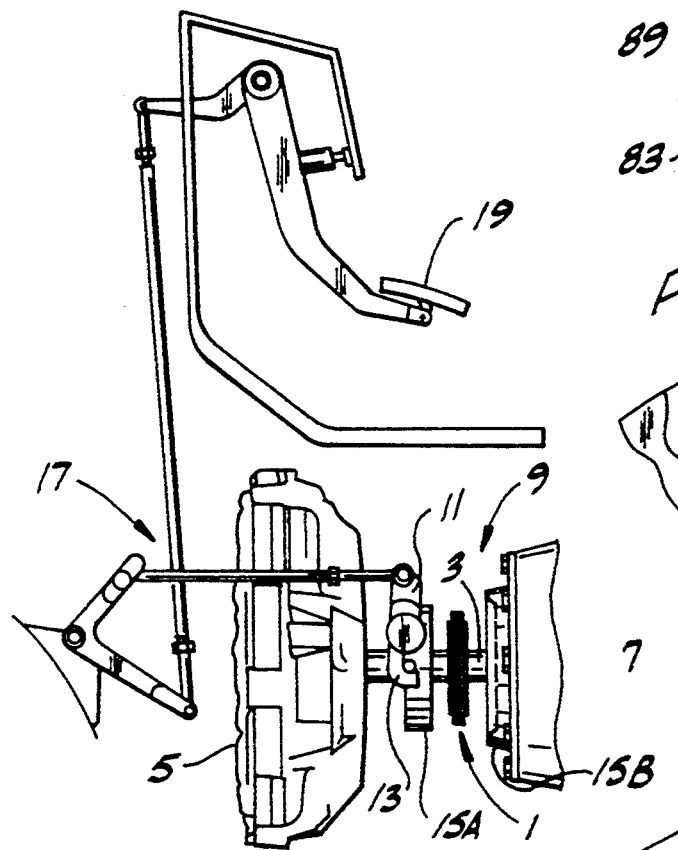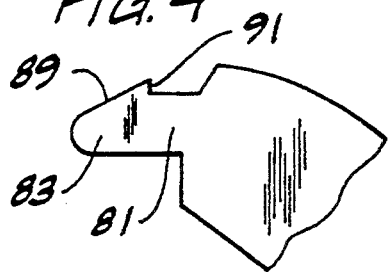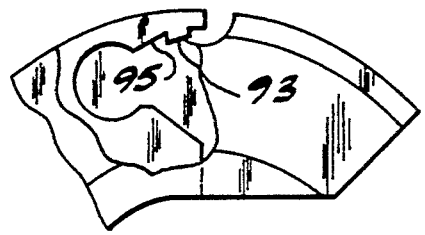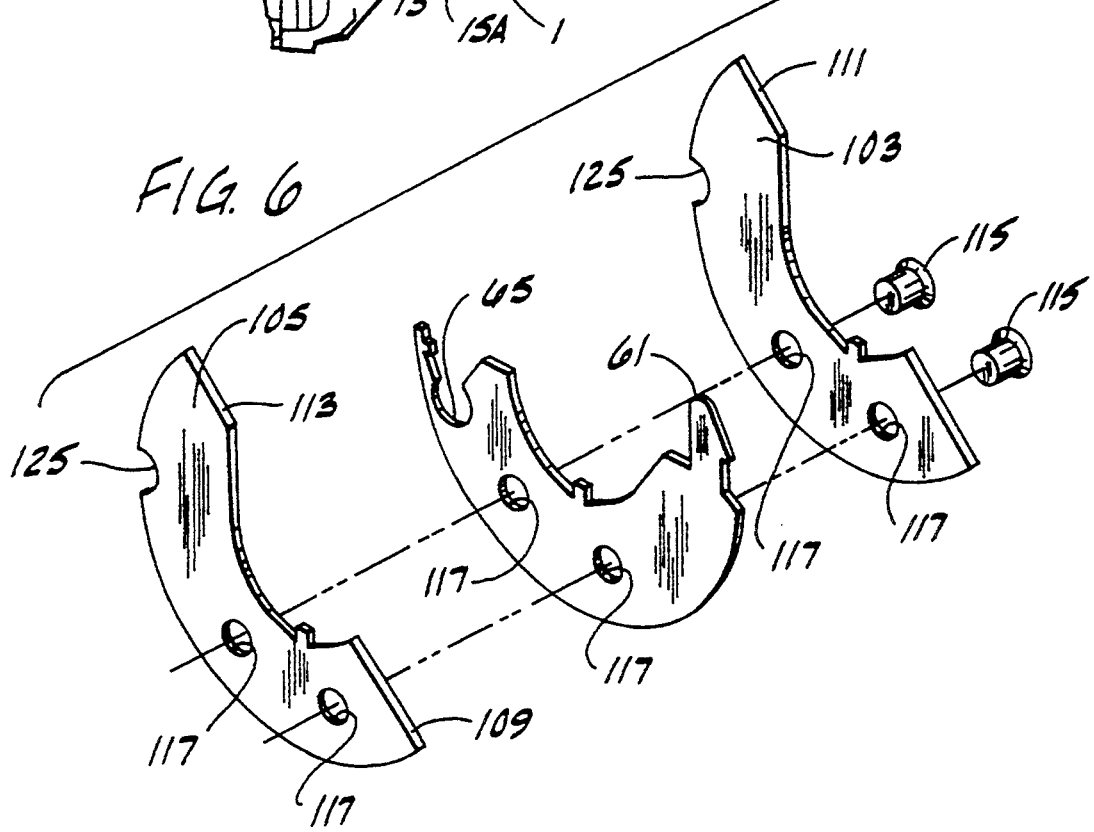

CLUTCH BRAKE AND METHOD FOR ATTACHING A CLUTCH BRAKE TO A SHAFT

SUMMARY OF THE INVENTION

This invention relates generally to braking systems and more particularly to a clutch brake having a friction surface for use in association with a braking mechanism for braking rotation of a shaft connecting an engine to a transmission.

Presently, there are clutch braking systems in vehicles, such as tractor trailer trucks (over-the-road trucks) with non-synchronized transmissions, for braking the rotation of an input shaft connecting an engine to a transmission. Generally, these systems are used when going between first gear and reverse, and include a clutch brake, having a friction pad on its surface, located between the engine and the transmission and attached to the input shaft. A clutch yoke having fingers for moving a clutch plate longitudinally along the input shaft is further provided for engaging the clutch plate with the clutch brake, and linkage connects a foot pedal to the clutch yoke for moving the clutch yoke Between clutch brake engaging and non-engaging positions. Typically, the clutch brake is an annular one-piece member which is initially installed before input shaft is attached to the transmission by slipping the clutch brake over the input shaft and securing it thereto. In time, the friction pad of the clutch brake wears and the clutch brake must be replaced. Heretofore, the only method for replacing such a one-piece member clutch brake has been to disconnect the transmission to reveal one end of the input shaft and slip the worn clutch brake off the input shaft and replace it with a new clutch brake. This method has proven to be a timely and costly procedure.

There are presently available clutch brakes which can be mounted on and removed from the input shaft without disconnecting the input shaft from the transmission. These clutch brakes are made in two pieces which are connected together by screw fasteners around the input shaft. However, it can be difficult and time consuming to connect and disconnect the pieces using screw fasteners.

Accordingly, there is a need for a two-piece clutch brake which can be easily replaced.

Among the several objects of this invention may be noted the provision of an improved clutch brake for a vehicle which may be installed on a shaft connecting the vehicle's transmission to its engine without disconnecting the shaft from the transmission or the engine; the provision of such a clutch brake which may be easily snapped on and removed from the shaft; and the provision of such a clutch brake which is easy to manufacture and cost efficient to make.

In general, a generally annular clutch brake for braking rotation of a shaft connecting an engine to a transmission comprises at least a first section and a second section. A friction surface on the first and second sections is adapted to face braking means associated with the clutch brake and to selectively engage the braking means for braking rotation of the shaft. Means selectively interconnects the first and second sections, such that the first and second sections are selectively configurable in a disconnected configuration in which the sections are adapted to be moved apart from one another and the clutch brake removed from the shaft with the shaft passing in a radial direction with respect to the clutch brake between the first and second sections, and in an interconnected configuration in which the clutch brake encloses the shaft and the first and second sections extend continuously along the circumference of the shaft and prevent the shaft from passing in a radial direction with respect to the clutch brake between the first and second sections. Thus, the clutch brake may be installed on and removed from the shaft without disconnecting the shaft from the transmission or the engine. The interconnecting means comprises first fastening means associated with the first clutch brake section and second fastening means associated with the second clutch brake section, The first fastening means is adapted for snap-lock interengagement with the second fastening means.

A method of the present invention for attaching a clutch brake to a shaft connecting an engine to a transmission without disconnecting the shaft from the engine or the transmission includes the step of providing a clutch brake having a first section and a second section. The first section is positioned on the shaft with the first section extending around a portion of the circumference of the shaft. The second section is positioned on the shaft with the second section extending around a portion of the circumference of the shaft. The first section and second section of the clutch brake are interconnected such that the clutch brake is held securely on the shaft. The step of interconnecting the first section and the second section comprises the step snapping the second section into locking engagement with the first section.

Other objects and features will be in part apparent and in part pointed out hereinafter.

BRIEF DESCRIPTION OF THE DRAWINGS

FIG. 1 is a schematic of a clutch brake assembly including a clutch brake disposed between a transmission and an engine of a vehicle;

FIG. 4 is an enlarged fragmentary front elevation of one of the clutch brake sections showing a locking tab;

FIG. 5 is an enlarged fragmentary front elevation of the other clutch brake section with parts broken away to show a recess for receiving tile locking tab; and FIG. 6 is an exploded perspective of a clutch brake section.

Corresponding reference characters indicate corresponding parts throughout the several views of the drawings.

DETAILED DESCRIPTION OF THE PREFERRED EMBODIMENT

Figure 2:
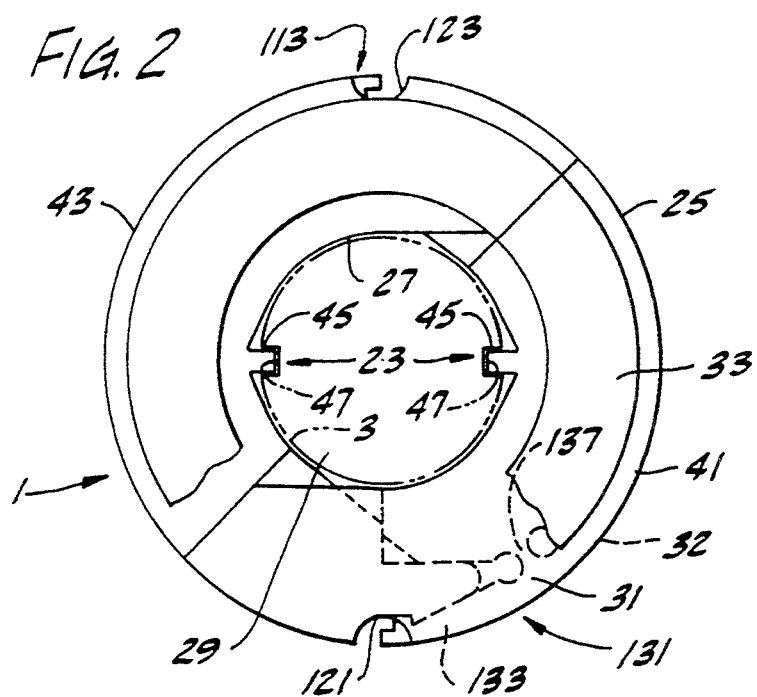
FIG. 2 is a front elevation of the clutch brake as mounted on a shaft.

Referring to the drawings, there is shown a clutch brake, generally indicated at 1, which is part of a clutch brake assembly used for braking rotation of a shaft 3. As shown in FIG. 1, clutch brake 1 is mounted for conjoint rotation on a shaft 3 connecting an engine 5 to a transmission 7. Clutch brake 1 is movable longitudinally along the shaft 3 for engagement by a braking mechanism 9 (broadly braking means), which is generally adjacent clutch brake 1, for slowing down shaft 3 when the transmission is changing gears.

Braking mechanism 9 comprises a yoke 11, pivotable about a generally central axis, which pivots between a free-rotation position and a braking position. In pivoting to its braking position, fingers 13, move a first clutch plate 15A, having a frictional surface, longitudinally along shaft 3 for engaging the clutch brake 1 on one side thereof. Generally, a clutch plate is a bearing housing cover having a frictional surface on one side thereof. In the free-rotation position, the clutch plate 15A is in a spaced relation away from the clutch brake. Upon being moved to its braking position and engaging the clutch brake 1, the clutch plate 15A is moved by yoke 11 to move the clutch brake longitudinally along shaft 3 thereby engaging a second clutch plate 15B. In this configuration, clutch brake 1 is sandwiched between clutch plates 15A, 15B thus slowing the rotation of shaft 3. A spring (not shown) biases the clutch brake 1 and clutch plate 15A back to the free-rotation position from the engaging position. In the free-rotating position, clutch plate 15B is also in a spaced relation away from the clutch brake 1. Moving the yoke between its free-rotation position and braking position is a linkage 17 activated by a foot pedal 19.

Figure 3:
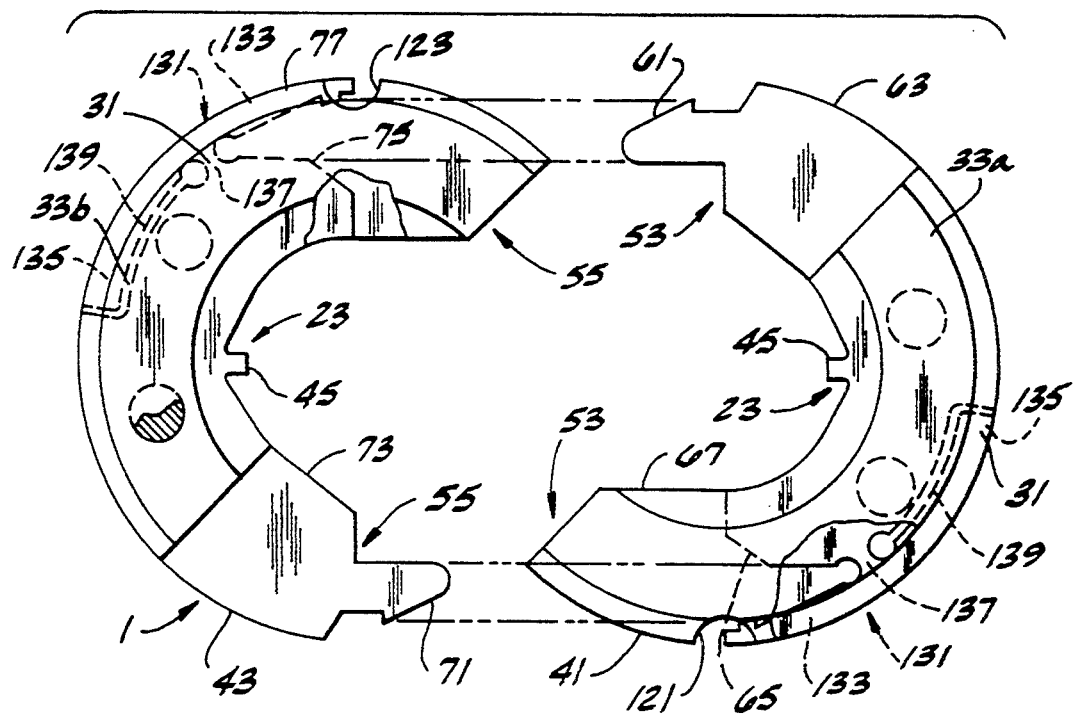
FIG. 3 is a front elevation of two sections of the clutch brake.

Turning now to FIGS. 2 and 3, clutch brake 1 includes means generally indicated at 23 for connecting the clutch brake to the shaft 3 for conjoint rotation of the clutch brake with the shaft. The clutch brake has an annular configuration having an outer diameter 25 and an inner diameter 27 which defines a central opening 29 adapted to receive shaft 3 therethrough. On one side 31 of clutch brake 1 there is provided a generally annular friction surface 33 facing the frictional surface on clutch plate 15A for selective engagement of the friction surface with the clutch plate to brake rotation of the shaft 3. Likewise, the other side 32 of clutch brake 1 has a friction surface 33 facing the friction surface on clutch plate 15B for engagement therewith.

The clutch brake comprises a first section 41 and a second section 43 which are selectively movable relative to one another between disconnected and interconnected configurations. In the disconnected configuration (see FIG. 3), friction surface 33 is discontinuous and the sections 41, 43 are movable generally radially relative to the shaft 3. In the interconnected configuration (see FIG. 2), the friction surface 33 is continuous and the sections 41, 43 enclose the shaft 3 in the central opening 29 and the sections are held from substantial radial motion relating to the shaft. Two generally semi-annular friction pads 33a, 33b adhered to respective clutch brake sections 41, 43 form the annular friction surface 33. Pads 33a, 33b may be made from vulcanized fiber and in the illustrated embodiment, are adhered to sections 41, 43 by PL-604-5 B. F. Goodrich Adhesive supplied by the B. F. Goodrich Co. These pads 33a, 33b are also adhered to the other side 32 of the clutch brake in addition to side 31 for an additional friction surface to engage clutch plate 15B.

The means 23 for connecting the clutch brake 1 to the shaft 3 includes two key members 45 extending radially inwardly into the central opening 29 from the inner diameter 27 of clutch brake 21. More specifically, each key member is formed generally centrally on the inner surface of each section member 41, 43 such that when the sections are interlocked, the key members extend towards one another. The key members 45 are engageable in two longitudinally extending slots 47 formed on opposite sides in shaft 3 so that the clutch brake 1 rotates conjointly with the shaft.

Means for releasably locking the sections 41, 43 together around the shaft 3 comprises in the embodiment first fastening means 53 associated with first clutch brake section 41 and second fastening means 55 associated with the second clutch brake section 43. The first fastening means 53 is adapted for snap-locking interengagement with the second fastening means 55. The first fastening means 53 includes a first tab 61 integrally formed at one end 63 of the first section 41 and a first recess 65 formed in its opposite end 67. Similarly, the second fastening means 55 includes a second tab 71 integrally formed at one end 73 of the second section 43 and a second recess 75 formed at its opposite end 77. For holding the two clutch brake sections 41, 43 together, the first tab 61 is adapted for snap-acting engagement in the second recess 75 and the second tab 71 is adapted for snap-acting engagement with the first recess 65.

Each tab 61, 71 and each recess 65, 75 are of the same construction, thus description of one will suffice for both. As shown in FIG. 4, the tab 61 comprises a neck 81 and a head 83 extending at one end thereof from the neck. Head 83 is rounded at its opposite end and has an outwardly sloped surface 89 which widens until it reaches a first shoulder 91 formed at the junction of the head 83 and the neck 81. The recess 75 is shaped generally like tab 61, but it is sized larger than the tab. A second shoulder 93 formed adjacent the recess 75 and forming a part of the second fastening means includes an engagement portion 95. As the clutch brake sections 41, 43 are moved together from a spaced apart position (FIG. 3) toward an interlocked position around the shaft 3 (FIG. 2), the head 83 of the tab 61 enters the recess 75. The outwardly sloping surface 89 of the tab 61 contacts the engagement portion 95 of the second shoulder. The tab 61 is resiliently deflected inwardly as it is inserted further into the recess 75 until the surface 89 moves beyond the engagement portion into the recess. The tab 61 then snaps outwardly, bringing the first shoulder 91 into face to face engagement with the second shoulder 93. The engagement of the first shoulder 91 with the second shoulders 93 prevents the tab 61 from being withdrawn from the recess 75. The tab 71 snaps into engagement in the recess 65 in the same fashion and at substantially the same time as the tab 61 snaps into the recess 75. In this way, the clutch brake sections 41, 43 are secured tightly around the shaft 3.

Each of the sections 41, 43 is made by sandwiching a lock plate 101 between two retaining plates 103, 105. The construction of the clutch brake sections 41, 43 may be understood by reference to FIG. 6 which shows an exploded view of the first section 41. The tab 61 of the first section 41 is formed integrally with the lock plate 101 at one end thereof, and the recess 65 is formed in the opposite end of the lock plate. In the preferred embodiment, at least the lock plate 101 is made of 1050 spring steel which is strong, but allows the tab 61 to be resiliently deflected. However, it is to be understood that the lock plate could be made of other materials having sufficient strength and elasticity and still fall within the scope of the present invention. To assemble the lock plate 101 and retaining plates 103, 105, openings 117 in the plates are aligned, and rivets 115 are received through them to secure the plates together. As assembled, the tab 61 projects beyond the adjacent ends 107, 109 of the retaining plates 103, 105, and the recess 65 is located entirely between the retaining plates adjacent to the opposite adjacent ends 111, 113 of the retaining plates.

The clutch brake 1 further includes a first passage 121 formed in the first clutch brake section 41 which provides access to the second tab 71 when it is engaged in the first recess 65. Passage 121 facilitates the use of an implement (not shown), such as a screw driver, for deflecting the second tab 71 so that first shoulder 91 is released from its engagement with second shoulder 93. More particularly, the implement engages the neck 81 to force the tab toward the clutch brake's 1 radial center thereby releasing the first shoulder from the second shoulder as the tab 71 is withdrawn from the recess 65. Likewise, a second passage 123 formed in the second clutch brake section 43 provides access to the first tab 61 engaged in the second recess 75 for deflecting the first tab to release its engagement with the second section 43. The first and second passages 121, 123 are defined by generally semi-circular notches 125 at the periphery of each of the retaining plates (FIG. 6). The adjacent notches 125 are located relative to the locking plate 101 so that they are generally aligned with the neck 81 of the tab (61 or 71) engaged in the recess (65 or 75).

FIGS. 3 and 6 further illustrate centrifugal lock means of the present invention generally indicated at 131 provided in the lock plate 101 of both clutch brake sections 41, 43 for applying a greater locking force to the first and second tabs 61, 71 in respective recesses 65, 75 as the shaft 3 rotates at higher speeds. Centrifugal lock means 131 comprises a detent member 133 associated with the first and second recesses 65, 75 of both clutch brake sections 41, 43. Each detent member 133 includes the aforementioned second shoulder 93 and engagement portion 95 and extends generally circumferentially of the section and at least partially defines the corresponding recess of the section. A counterweight 135 extends from the detent member 133 in an opposite direction from the detent member along the circumference of the section. A neck 137 extending radially from an interior region of the section connects the detent member 133 and the counterweight 135 to the section generally at the junction of the detent member and the counterweight. The detent member 133 is spaced from the remainder of the lock plate 101 such that an edge of the detent member defines a portion of an edge of the recess (e.g., recess 65) formed in the lock plate. Likewise, the counterweight is also spaced from the remainder of the lock plate 101 because of a slot 139 formed in the lock plate.

The neck 137 defines a pivot point about which the detent member 133 and counterweight 135 are adapted to pivot. The counterweight 135 has a greater mass than the mass of the detent member 133 so that the counterweight 135 pivots on the neck 137 radially outwardly as the shaft 3 rotates thereby causing the detent member 133 to pivot radially inwardly against the corresponding tab (61 or 71) of the other section. This inward movement of the detent member 133 as the shaft 3 rotates increases the locking force between the shoulder 93 of the recess and the shoulder 91 of the tab. Thus, as the shaft 3 rotates at higher speeds, the greater the locking force to the first and second tabs 61, 71 in respective recesses 65, 75.

In use, first section 41 of the clutch brake 1 is positioned so that it engages shaft 3 with the first section extending approximately half way around the circumference of the shaft. The second section 43 is then positioned in engagement with the shaft 3 and interlocked with the first section 41 by the first and second fastening means 53, 55 so that the first and second sections form a continuous annular surface extending around the circumference of the shaft. Thus, it may be seen that the sections 41, 43 can be positioned on the shaft 3 by radial movement with respect to the shaft whereas previously clutch brakes were positionable on the shaft only with axial movement relating to the shaft (i.e., by sliding on an exposed end of the shaft). The shaft 3 does not have to be disconnected from the transmission 7 or the engine 5 to install or remove the clutch brake.

Tabs 61, 71 are snap-locked into respective recesses 75, 65 such that a first shoulder 91 located in a tab is in engagement with a second shoulder 93 formed in a recess, thereby forming a locking connection. Key member 45 must be aligned with the longitudinal slot 47 formed in shaft 3 to back the clutch brake 1 for conjoint rotation with the shaft. After a period of time, when the friction surface 33 of clutch brake 1 becomes worn, the first section 41 of the worn clutch brake is released from interlocking engagement with the second section 43. The sections are moved generally radially relative to the shaft and away from each other and withdrawn from around the shaft 3. It is to be understood that in the preferred embodiment, the sections 41, 43 are completely separated to be engaged on or withdrawn from the shaft. However, it is envisioned that the sections 41, 43 could be pivotally interconnected at one end for swing apart to be installed on or removed from the shaft. The releasing of the sections 41, 43 from each other is most easily accomplished by using an implement, such as a screw driver, to release a tab 61 (or 71) from engagement with its associated recess 75 (or 65) through a passage 121 (or 123) providing access thereto. Next, a new clutch brake 1 is installed as previously described for engagement with clutch plates 15A, 15B of braking mechanism 9.

In view of the above, it will be seen that the several objects of the invention are achieved and other advantageous results attained.

As various changes could be made in the above constructions without departing from the scope of the invention, it is intended that all matter contained in the above description as shown in the accompanying drawing shall be interpreted as illustrative and not in a limiting sense.

What is claimed is:

1. A clutch brake for use in association with braking means for braking rotation of a shaft connecting an engine to a transmission, the clutch brake being generally annular in shape and comprising at least a first section and a second section, a friction surface on the first and second sections adapted to face said braking means and to selectively engage said braking means for braking rotation of the shaft, means for snap-lock interconnection of the first and second sections, the first and second sections being selectively configurable in a disconnected configuration in which the sections are adapted to be moved apart from one another and the clutch brake removed from the shaft with the shaft passing in a radial direction with respect to the clutch brake between the first and second sections, and in an interconnected configuration in which the clutch brake encloses the shaft and the first and second sections extend continuously along the circumference of the shaft and prevent the shaft from passing in a radial direction with respect to the clutch brake between the first and second sections, whereby the clutch brake may be installed on and removed from the shaft without disconnecting the shaft from the transmission or the engine, said snap-lock interconnection means comprising first fastening means associated with the first clutch brake section and second fastening means associated with the second clutch brake section, said second fastening means being shaped to deflect said first fastening means upon movement of said first fastening means into said second fastening means and to engage said first fastening means to hold said first and second sections in the interconnected configuration.

2. A clutch brake as set forth in claim 1 wherein said first fastening means comprises a first tab associated with the first section, and wherein said second fastening means comprises a recess in the second section, the first tab defining a first shoulder and the recess defining a second shoulder engageable with the first shoulder in the interconnected configuration of the first and second sections for holding the first and second sections in the interconnected configuration.

3. A clutch brake as set forth in claim 2 wherein said first tab is formed as one piece with the first section, said first fastening means further comprising a recess in the first section, and wherein said second fastening means further comprises a second tab formed integrally with the second section, the second tab and the first section being constructed for releasable snap-locking engagement of the second tab in the recess in the first section.

4. A clutch brake as set forth in claim 3 wherein said interconnecting means further comprises first passage means formed in the first clutch brake section and providing access to the second tab engaged in the recess in the first section for selectively deflecting the second tab to release its engagement with the first section, and second passage means formed in the second clutch brake section and providing access to the first tab engaged in the recess in the second section for selectively deflecting the first tab to release its engagement with the second section.

5. A clutch brake as set forth in claim 3 further comprising centrifugal lock means associated with the first and second fastening means for applying a greater locking force to the first and second tabs as the shaft rotates at higher speeds.

6. A clutch brake as set forth in claim 5 wherein said centrifugal lock means comprises detent members associated with the recesses in the first and second clutch brake sections, each detent member extending generally circumferentially of a respective one of the first and second sections and at least partially defining the corresponding recess of said one section, a neck on said one section extending radially inwardly from an interior region of said one section and connecting the detent member to said one section, and a counterweight extending from the neck in an opposite direction from the detent member along the circumference of said one section, the neck defining a pivot point about which the detent member and counterweight are adapted to pivot, the counterweight having a mass greater than the mass of the detent member such that the counterweight is adapted to pivot radially outwardly on the neck as the shaft rotates causing the detent member to pivot radially inwardly against the corresponding first or second tabs of the other of the first and second sections received in the corresponding recess in said one section to increase the locking force applied to the corresponding tabs.

7. A clutch brake as set forth in claim 1 further comprising centrifugal lock means associated with the first and second fastening means for applying a greater locking force to the first and second sections as the shaft rotates at higher speeds.

8. A clutch brake assembly for selectively braking the rotation of a shaft connecting an engine to a transmission, the assembly comprising:

a generally annular clutch brake;

braking means mounted in a position adjacent the clutch brake; and means for selectively moving said braking means between a disengaged position in which said braking means is in a spaced relation to the clutch brake and a braking position in which said braking means engages the clutch brake, said clutch brake having at least a first section and a second section, a friction surface on the first and second sections adapted to face said braking means and to selectively engage said braking means for braking rotation of the shaft, and means for snap-lock interconnection of the first and second sections, the first and second sections being selectively configurable in a disconnected configuration in which the sections are adapted to be moved apart from one another and the clutch brake removed from the shaft with the shaft passing in a radial direction with respect to the clutch brake between the first and second sections, and in an interconnected configuration in which the clutch brake encloses the shaft and the first and second sections extend continuously along the circumference of the shaft and prevent the shaft from passing in a radial direction with respect to the clutch brake between the first and second sections, whereby the clutch brake may be installed on and removed from the shaft without disconnecting the shaft from the transmission or the engine, said snap-lock interconnection means comprising first fastening means associated with the first clutch brake section and second fastening means associated with the second clutch brake section, said second fastening means being shaped to deflect said first fastening means upon movement of said first fastening means into said second fastening means and to engage said first fastening means to hold said first and second sections in the interconnected configuration.

9. A clutch brake as set forth in claim 8 wherein said first fastening means comprises a first tab associated with the first section, and wherein said second fastening means comprises a recess in the second section, the first tab defining a first shoulder and the recess defining a second shoulder engageable with the first shoulder in the interconnected configuration of the first and second sections for holding the first and second sections in the interconnected configuration.

10. A clutch brake assembly as set forth in claim 9 wherein the first tab is formed as one piece with the first section, said first fastening means further comprising a recess in the first section, and wherein said second fastening means further comprises a second tab formed integrally with the second section, the second tab and the first section being constructed for releasable snap-locking engagement of the second tab in the recess in the first section.

11. A clutch brake assembly as set forth in claim 10 further comprising centrifugal lock means associated with the first and second fastening means for applying a greater locking force to the first and second tabs as the shaft rotates at higher speeds.

12. A clutch brake assembly as set forth in claim 11 wherein said centrifugal lock means comprises a detent member associated with the first and second recesses of the first and second clutch brake sections, each detent member extending generally circumferentially of a respective one of the first and second sections and at least partially defining the corresponding first or second recess of said one section, a neck on said one section extending radially from an interior region of said one section and connecting the detent member to said one section, and a counterweight extending from the neck in an opposite direction from the detent member along the circumference of said one section, the neck defining a pivot point about which the detent member and counterweight are adapted to pivot, the counterweight having a mass greater than the mass of the detent member such that the counterweight is adapted to pivot radially outwardly on the neck as the shaft rotates causing the detent member to pivot radially inwardly against the corresponding first or second tab of the other of the first and second sections received in the corresponding recess in said one section to increase the locking force applied to the corresponding tab.

13. A clutch brake assembly as set forth in claim 11 wherein said interconnecting means further comprises first passage means formed in the first clutch brake section and providing access to the second tab engaged in the first recess for selectively deflecting the second tab to release its engagement with the first section, and second passage means formed in the second clutch brake section and providing access to the first tab engaged in the second recess for selectively deflecting the first tab to release its engagement with the second section.

14. A clutch brake assembly as set forth in claim 8 further comprising centrifugal lock means associated with the first and second fastening means for applying a greater locking force to the first and second sections as the shaft rotates at higher speeds.

15. A method for attaching a clutch brake to a shaft connecting an engine to a transmission without disconnecting the shaft from the engine or the transmission, the method comprising the steps of providing a clutch brake having a first section and a second section, positioning the first section on the shaft with the first section extending around a portion of the circumference of the shaft, positioning the second section on the shaft with the second section extending around a portion of the circumference of the shaft, and interconnecting the first section and second section of the clutch brake such that the clutch brake is held securely on the shaft, said step of interconnecting the first section and the second section comprising the step of snapping the second section into locking engagement with the first section.

16. A method as set forth in claim 15 comprising, prior to said step of positioning the first section, the steps of releasing locking connection of a first section of a prior clutch brake mounted on the shaft to a second section of the prior clutch brake, and withdrawing the sections from around the shaft in a generally radial direction.

17. A method as set forth in claim 15 wherein said step of positioning the second section and said step of interconnecting the first section and the second section are carried out substantially simultaneously.

* * * * *